Patented Jan. 7, 1936

2,026,623

UNITED STATES PATENT OFFICE 2,026,623

VAT DYESTUFF PASTE AND PROCESS FOR PRODUCING THE SAME

Maurice H. Fleysher and James Ogilvie, Buffalo, N. Y., assignors to National Aniline & Chemical Company, Inc., New York, N. Y., a corporation of New York No Drawing. Application May 11, 1932, Serial No. 610,704

24 Claims. (Cl. 260—61)

This invention relates to vat dyestuffs and the process of making them. It relates particularly to the production of vat dyes of the anthraquinone and indigoid series in a finely divided form which is particularly adapted for making dyestuff pastes suitable for use in dyeing textile material by the printing process.

As is well known, the printing of textile fabrics with vat dyestuffs, and particularly the vat dyestuffs of the types above mentioned, differs from ordinary dyeing with said dyestuffs in that the fabric is dyed only at particular portions, the remaining fabric being left undyed so as to form a design. In general, textile printing is carried out in practice by transferring a so-called printing paste from a metal roll engraved in accordance with the desired design by passing the fabric to be printed into contact with the roll, the engravings of which are filled with the printing paste. Inasmuch as vat dyes are not soluble and do not directly dye the fiber but are required to be reduced to a soluble form, the printing pastes generally contain a reducing agent, such as sodium formaldehyde sulfoxylate, and alkali in addition to water and an adhesive or thickening material (such as gums, various forms of starch, etc.). Frequently various additional materials, such as glycerin, glycol ethers and the like are also included in the printing paste to assist in the absorption of the color by the fabric. After the cloth has been printed with the printing paste, it is generally passed through a dryer, which temporarily fixes the printing paste in the dry form upon the fabric, so as to prevent the paste from spreading and spoiling the design. The dried fabric is then passed through a steam ager, which is maintained under suitable conditions of temperature and moisture to produce reduction of the vat dyestuff on the fabric to the soluble form, which is absorbed by the fibre, and then the fabric is subjected to an oxidation treatment to reconvert the reduced vat dyestuff to the unreduced, insoluble form. The fabric is then subjected to a washing treatment to remove any residual dyestuff and other materials remaining from the fixing process.

In view of the fact that the details of the formulas of printing pastes used by various printers vary with the individual dyestuffs used, with the mixtures of dyestuffs employed to obtain various color combinations, with the other ingredients used for making the printing pastes, and with the materials treated, vat dyestuffs are not ordinarily sold in the form of the finished printing paste but in the form of a so-called "dyestuff paste" or "color paste", which is generally a water suspension of the unreduced vat dyestuff with which sometimes a small amount of a dispersing agent and/or printing assistants such as glycerol, diethylene glycol, an alkylolamine, and the like have been incorporated. The printer can then mix the required amount of the dyestuff paste with the other necessary ingredients according to the particular formula to be used. In order to facilitate compounding the formulas, the dyestuffs are generally placed upon the market in the form of pastes containing standard concentrations of dyestuffs, as for example, 10 per cent, 20 per cent, and 30 per cent, or higher, pastes.

It will be readily apparent that a satisfactory dyestuff paste should preferably possess, among others, the qualities of being homogeneous, of being readily poured and mixed with the other ingredients, and of uniformly maintaining its condition over relatively long periods of time, so that large supplies of the dyestuff paste may be maintained in stock and portions withdrawn therefrom as needed; and that the dyestuff in the paste should preferably be in a finely divided form and possess such a physical character that strong uniform prints and clear and sharp outlines will be obtained.

Various processes have been heretofore proposed for the production of vat dyestuffs in the form of pastes resulting from filtration of suspensions of the insoluble dyestuffs, but the products heretofore produced have not possessed all of the physical characteristics desirable in a vat dyestuff paste to be used for making printing pastes. Thus, it has been proposed to produce dyestuff pastes of chlorinated indanthrones or of flavanthrone by blowing air through an alkaline solution of the leuco compounds thereof, or oxidizing them in other ways, and filtering off the resulting precipitate. And it has been proposed to form a solution of flavanthrone in concentrated sulfuric acid and pour it onto a large amount of ice, or to mix the concentrated sulfuric acid solution of the dyestuff with a large quantity of water (10 parts of water per part of sulfuric acid solution), and filter off the resulting precipitate to produce a dyestuff paste. It has also been proposed to dilute a solution of flavanthrone, dichlor-isoviolanthrone, etc., with a small amount of water or ice (about 1/7th part by weight of water or ice, based upon the weight of the sulfuric acid solution) to precipitate the dyestuff in the form of a sulfate, filter off the sulfate of the dyestuff, and then decompose the sulfate with water, and filter off the resulting precipitate. These products are not satisfactory for making printing pastes for one or more of the following reasons: Reduction in the ager does not take place with sufficient rapidity, and the desired sharpness of outline is not obtained; prints are obtained which are mottled and/or specked; and, when the paste is mixed with a printing assistant (such as diethylene glycol) and a small amount of a dispersing agent, and the mixture is evaporated to produce a dyestuff paste containing 20 to 45 per cent of dry dyestuff—and in some cases even without the addition and evaporation—the paste is so viscous and stiff that it cannot readily be poured and mixed with the other ingredients of the printing paste, or the resulting prints are of inferior tinctorial quality.

We have discovered that the difficulty had with the vat dyestuff pastes, particularly printing pastes, resulting from the said prior art processes is due mainly to the density, form and size of the particles of dyestuffs in the paste.

We have found, for example, that the size of the particles of the dyestuffs in the pastes of the prior art were either too large or too small for satisfactory results; thus we have found uneven outlines and slow speed of reduction are caused by particles of too great size, and that the tendency of the pastes, particularly printing pastes, to become stiff and difficult to pour is due, at least to a large extent, to the insufficient density and the extremely fine subdivision, i. e., excessively small size of the particles of dyestuff.

It is accordingly an object of our intention to produce pastes of vat dyestuffs containing the vat dyestuffs in the form of particles which are sufficiently small and/or dense to give a well-defined print but which are yet sufficiently large to enable the resulting paste to be readily poured and mixed with other printing ingredients, particularly when in the form of concentrated pastes and/or when containing assistants, such as glycols, their ethers, etc.

Other objects of the invention will in part be obvious and will in part appear hereinafter.

We have found, in accordance with the present invention, that the physical form of vat dyestuffs can be controlled, so as to produce vat dyestuff pastes highly satisfactory for making printing pastes, by controlling the precipitation of the vat dyestuffs from their sulfuric acid solutions upon dilution with water or other diluting liquid. We have found, in accordince with the present invention, by controlling the extent of dilution and the temperature at which the precipitation is brought about, and preferably also by controlling the speed and order of mixing the solution and the diluting liquid, that the resulting precipitates form dyestuff pastes which have excellent fluidity and workability, which pad well, and which are especially adapted for making printing pastes of excellent quality.

The invention accordingly comprises the steps and the relation of one or more with others thereof which will be exemplified in the process hereinafter disclosed, and the products having the properties and characteristics which will be exemplified in the products hereinafter disclosed. The scope of the invention will be indicated in the appended claims.

In the practice of the present invention, in accordance with a preferred method of procedure, a sulfuric acid solution of a vat dyestuff is mixed with warm or hot water, and the resulting precipitated dyestuff is separated from the remaining solution. The sulfuric acid solution is preferably added to the water to effect rapid dilution. The separated precipitate then may be washed with water, to remove the acid, and/or with alkali followed by a water wash, and made into a paste in any suitable manner.

The amount of water employed should be greater than that which would cause considerable separation of the dyestuff in the form of the sulfate, or oxonium salt, and less than that which would cause considerable separation of the dyestuff in the form of amorphous flocks. Ordinarily the water may be employed in amounts of about 0.5 to about 2 parts by weight, and preferably 0.7 to 1.5 parts by weight, per part of sulfuric acid solution of the dyestuff. It is desirable that the sulfuric acid solution and the water be at such temperatures that the temperature of the resulting mixture is not substantially below 50° C., and preferably between 60° C. and the boiling point of the mixture. For best results, the sulfuric acid solution and the diluting water should both be at a temperature not substantially below 50° C., and the sulfuric acid solution should be rapidly added to the water, preferably without agitation other than that produced by the addition. After the acid solution has been added to the water the mixture should preferably be agitated. If desired the mixture of precipitate and solution produced by the dilution may be further diluted with any suitable amount of water (hot or cold) to facilitate handling and separation, without adversely affecting the quality of the product.

The products thus obtained appear to contain the dyestuff in a very finely divided, non-flocculent form and/or have a density greater than the products obtained by drowning the sulfuric acid solution in a large quantity of water and less than the products ordinarily obtained by the aqueous hydrolysis of the oxonium salt and produce pastes which have superior qualities as to fluidity, padding and printing. In some cases the product appears to be crystalline in form, while in other cases a definite crystalline structure is not apparent; the product appears, however, to tend to the semi-crystalline or crystalline form, as evidenced by the paste having a sheen in reflected light when stirred. In some cases the process produces a modification in the shade of dyeing obtained with a particular dyestuff. While the resulting dyestuff may, for that reason, not be suitable for producing dyeings or prints of the usual shade for that dyestuff, it may be used to produce dyeings of the modified shade, and has in addition the advantageous physical properties above set forth.

The process is applicable to the production of dyestuff pastes of various vat dyestuffs. Thus it may be employed to produce pastes of vat dyestuffs of the anthraquinone series, as for example, the indanthrone dyestuffs, the flavanthrone dyestuffs, the pyranthrone dyestuffs, the benzanthrone dyestuffs (the violanthrones, isoviolanthrones, etc), the naphthacridone dyestuffs, the anthanthrone dyestuffs, (including the chloro-, bromo- and other derivatives thereof), etc.; of vat dyestuffs of the indigoid series, as for example, the halogenated indigo dyestuffs, the thioindigo dyestuffs and their derivatives, etc.; as well as of other vat dyestuffs.

The sulfuric acid solution of the dyestuff may be prepared in any suitable manner. Thus, for example, the dyestuff may be dissolved in concentrated sulfuric acid, with heating if necessary; or the sulfuric acid solution of the dyestuff may result from the process of preparation of the dyestuff, such as the sulfuric acid solution of chlorinated indanthrone resulting from chlorination of indanthrone in sulfuric acid and reduction with ferrous sulfate or aluminum, as described for example in U. S. P. 1,847,330 or 1,847,332.

The conditions of temperature, concentration and amount of sulfuric acid, amount of water employed for the dilution, and the like are somewhat interdependent and may vary for optimum results with the different dyestuffs treated. Ordinarily from about 5 to about 10 parts by weight of concentrated sulfuric acid per part of dyestuff may be employed to produce satisfactory results, and the sulfuric acid may vary in strength, preferably from about 90 per cent. sulfuric acid to oleum. For ease in operation sulfuric acid monohydrate is preferably employed to dissolve the dyestuff and if desired the solution then may be diluted to a more optimum concentration. The temperature of the sulfuric acid solution preferably should not be raised to such a high value that, with the strength of sulfuric acid employed, sulfonation will occur to any substantial extent; as otherwise the yield and/or quality of the resulting dyestuff paste will be decreased.

In some cases superior results may be obtained by preliminarily diluting the solution of the vat dyestuff in concentrated sulfuric acid with water, alcohol, acetic acid or a substance containing water of crystallization, so as to reduce the concentration of the sulfuric acid solution to the point of about incipient crystallization or precipitation, but without producing any substantial crystallization or precipitation, of the vat dyestuff from the solution, and then adding the diluted solution to the warm or hot water to produce the final precipitation. In individual cases the desired result may be secured even if a small amount of the vat dyestuff precipitates, or crystallizes in the form of the sulfate, in the preliminary dilution.

The precipitate formed in accordance with the process of the present invention may be separated from the remaining solution of sulfuric acid in any suitable manner, as for example by centrifugation, vacuum or pressure filtration, etc.; and the resulting separated precipitate (which will hereinafter be referred to as the "filter cake") may be made into a dyestuff paste in any suitable manner. It is preferably agitated with the addition of a small amount (1 to 5 per cent.) of a suitable dispersing agent; as for example a polynuclear aromatic sulfonic acid, an alkyl-, aralkyl-, or cycloalkyl-, polynuclear aromatic sulfonic acid, aldehyde condensation products of any of the said sulfonic acids, a sulfite cellulose waste liquor product, etc. (such as, naphthalenesulfonic acids; propyl-, butyl-, benzyl-, or cyclohexyl-naphthalenesulfonic acids; condensation products of formaldehyde with the said naphthalene and substituted naphthalenesulfonic acids; ligninsulfonic acid; mildly oxidized sulfite cellulose waste liquor; etc.).

If it is desired to market the paste in a concentrated form and containing a printing assistant, such as an alkylalomine, a glycerol, a glycol, a thioglycol, a polyglycerol, a polyglycol, or other ether of glycerine or of glycol, etc., the printing assistant may be incorporated into the paste, and water may be removed by evaporation to the desired extent. The pastes obtained in this manner remain fluid even in concentrated form, and may be readily mixed with other ingredients.

The process of the present invention may be employed in conjuction with other processes for the purification of vat dyestuffs. For example the vat dyestuff may be purified by crystallization in the form of a sulfate, or oxonium salt, in the well-known manner (for example by the gradual addition of a very small amount of water or ice to a solution of the vat dyestuff in concentrated sulfuric acid, and filtering off the crystallized sulfate, or oxonium salt, thereby produced), and the purified crystals then may be redissolved in concentrated sulfuric acid and subjected to the process of the invention; or the dyestuff (as for example flavanthrone, or halogenated dibenzanthrones or isodibenzanthrones) in the form of an aqueous suspension may be subjected to an oxidation treatment, as for example, with an alkali or alkaline earth metal hypochlorite in the well-known manner, either before or after undergoing precipitation by the process of the present invention, and, if necessary, may then be subjected to the process of the present invention to produce it in the desired form.

The invention will be illustrated by the following specific examples. The parts are by weight.

*Example 1.*—100 lbs. of flavanthrone (Colour Index No. 118) is dissolved in 1000 lbs. of sulfuric acid monohydrate at 100° C. The resulting solution is then cooled to about 50° C. and poured rapidly into 666 lbs. of water at an initial temperature of 60° to 65° C. without stirring. The resulting mixture is then thoroughly mixed by agitation. To the agitated mixture, there is added water (at room temperature) in sufficient amount to reduce the concentration of the sulfuric acid to about 10 to 15 per cent. strength, and the precipitated flavanthrone is filtered off on a nutsch under vacuum and washed with water until it is acid free. When no more water is drawn off from the precipitate on the nutsch, the precipitate is removed and made into an aqueous or printing paste of any desired strength in any well-known manner. The press-cake (nutschcake) obtained in this manner, in spite of its high dye content, on being stirred with a dispersing agent (e. g., 1 to 3 per cent. by weight of Leukanol) becomes fluid and can be readily poured from one container to another. Moreover, such a paste after treatment with a dispersing agent is capable of being mixed with printing assistants and evaporated to give a paste which is still fluid even when the dye content of such a paste is 20 to 45 per cent.

The flavanthrone obtained in this manner appears under the microscope to be in the form of finely sub-divided crystals which are in the shape of small blades or prisms. While crude flavanthrone may be treated in accordance with this example, purified flavanthrone is preferably employed. The sulfuric acid may vary considerably in amount and strength so long as it is sufficient to hold the dyestuff in solution under the existing temperature conditions before the solution is mixed with water. As above pointed out, the temperature also may vary, but a temperature and concentration of acid which will produce substantial sulfonation should preferably be avoided.

Example 2.—100 lbs. of dichlor-isoviolanthrone (Colour Index No. 1104) is dissolved in 1000 lbs. of sulfuric acid monohydrate at room temperature, and to the stirred solution there is slowly added 170 lbs. of water. The temperature of the mixture rises to about 90° C. No precipitate should be present. The solution is then quickly poured into 1000 lbs. of water at 65° to 75° C., without stirring. The mixture is then stirred, diluted with about 9000 to 10000 lbs. of water (hot or cold), and the precipitate filtered off and washed acid free with water, then with a dilute soda ash solution, and finally with water until free from alkali. Ordinarily, the press-cake contains about 13 to 18 per cent. of dyestuff and 87 to 82 per cent. of water. This press-cake upon the addition of a small amount of a dispersing agent (1 to 3 per cent. of Leukanol) becomes fluid and is readily incorporated with printing assistants (glycerol, diethylene glycol, etc.) to give color pastes which can be evaporated to give even stronger pastes which remain fluid. Further, these fluid pastes are readily mixed with thickening agents, such as gums, starches, dextrine, etc., to give printing pastes which are also fluid and give prints of full strength which are even in character.

The dichlor-isoviolanthrone obtained in accordance with this example is, in the form of a paste, dark chocolate to reddish brown in color and upon stirring has a sheen in reflected light.

In this example, the temperature of the initial sulfuric acid solution may vary from room temperature to about 100° C. or higher, provided sulfonation is avoided, but temperatures around 60° to 90° C. are preferred. If desired, the dilution of the acid solution may be omitted and the undiluted solution may be poured directly into the water to produce precipitation of the dyestuff. In the latter case a sulfuric acid concentration of about 90 per cent. is preferably employed instead of the sulfuric acid monohydrate for preparation of the original solution. The procedure including the dilution is preferred, however.

Example 3.—Dissolve 350 parts of indanthrone in 5250 parts of well-stirred sulfuric acid of 66° Bé. strength at 50° C. in a suitable chlorination kettle equipped with cooling means and an agitator and connected with a vent. Into this solution, kept well agitated and maintained at a temperature between 15° and 50° C., and preferably at about 35° C., pass a current of chlorine, preferably through a diffuser, at a rate slightly in excess of that at which it is approximately absorbed, that is, about 85 to 90 per cent. or more of the chlorine passed in is absorbed. It is preferable that substantially all of the air in the apparatus be displaced by chlorine during the process. When a test sample shows the desired percentage of chlorine to be present, the addition of chlorine is discontinued. The reaction mixture is then treated with 525 parts of crystallized ferrous sulfate, keeping the temperature below 40° C., and stirring for about one-half hour. The temperature of the mixture is then raised to about 125° C. and held at this point for about one hour. The resulting reaction mixture is then drowned as quickly as possible in 8600 parts of water, which has been preheated to 60° C., without stirring. The diluted mass is then stirred and sufficient cold water is added to dilute the sulfuric acid to a strength of about 7 per cent. to 10 per cent. The precipitated product is then filtered off, washed first with water until practically free from acid, then with a 2 per cent. sodium carbonate solution, and finally with water until substantially free from alkali. The resulting chlorindanthrone produces printing pastes of very good quality.

Since changes may be made in carrying out the process and in the products above described without departing from the scope of the invention, all matter contained in the above description is to be interpreted in an illustrative and not in a limiting sense, except as limited by the appended patent claims.

We claim:

1. A process for producing a vat dyestuff in finely divided, solid form, which comprises mixing a solution of the vat dyestuff in concentrated sulfuric acid with warm to hot water, the amount of water being greater than that which would cause separation of the dyestuff in the form of the sulfate and less than that which would cause substantial separation of the dyestuff in the form of amorphous flocks, whereby a precipitate of the vat dyestuff is produced.

2. A process for producing a vat dyestuff in finely divided, solid form, which comprises rapidly diluting a solution of the vat dyestuff in concentrated sulfuric acid with warm to hot water, the amount of water being greater than that which would cause separation of the dyestuff in the form of the sulfate and less than that which would cause substantial separation of the dyestuff in the form of amorphous flocks, whereby a precipitate of the vat dyestuff is produced.

3. A process for producing a vat dyestuff in finely divided, solid form, which comprises rapidly adding a solution of the vat dyestuff in concentrated sulfuric acid at a temperature not substantially below 50° C. to water which is at a temperature between 50° C. and the boiling point, the amount of water being greater than that which would cause separation of the dyestuff in the form of the sulfate and less than that which would cause substantial separation of the dyestuff in the form of amorphous flocks, whereby a precipitate of the vat dyestuff is produced, and separating the precipitate from the remaining liquid.

4. A process for producing a vat dyestuff in finely divided, solid form, which comprises rapidly diluting a solution of the vat dyestuff in concentrated sulfuric acid with about 0.5 to about 2 parts of water which is at a temperature not substantially below 50° C., whereby a precipitate of the vat dyestuff is produced.

5. A process for producing a vat dyestuff in finely divided solid form, which comprises adding a solution of the vat dyestuff in concentrated sulfuric acid to about 0.7 to about 1.5 parts of water which is at a temperature not substantially below 50° C., whereby a precipitate of the vat dyestuff is produced.

6. A process for producing a vat dyestuff in finely divided, solid form, which comprises rapidly adding a solution of the vat dyestuff in concentrated sulfuric acid to about 0.5 to about 2 parts of water, the sulfuric acid solution and the water both being at temperatures not substantially below 50° C., whereby a precipitate of the vat dyestuff is produced, and separating the precipitate from the remaining liquid.

7. In the process of making a vat dyestuff composition in the form of a paste by precipitating the vat dyestuff, separating the precipitate, and stirring the separated precipitate in the presence of a dispersing agent, the improvement which comprises rapidly adding a solution of the vat dyestuff in about 5 to 10 times its weight of concentrated sulfuric acid to about 0.5 to about 2 parts of water, the sulfuric acid solution and the water both being at temperatures not substantially below 50° C., whereby a precipitate of the vat dyestuff is produced, and separating the precipitate from the remaining liquid.

8. The process of making a dyestuff paste of an anthraquinone vat dyestuff which comprises adding a solution of the anthraquinone vat dyestuff in concentrated sulfuric acid to about 0.5 to about 2 parts of water which is at a temperature not substantially below 50° C., whereby a precipitate of the vat dyestuff is produced, and separating the precipitate from the remaining liquid.

9. In the process of making an anthraquinone dyestuff composition in the form of a paste by precipitating the vat dyestuff, separating the precipitate, and stirring the separated precipitate in the presence of a dispersing agent, the improvement which comprises rapidly adding a solution of the anthraquinone vat dyestuff in about 100 per cent. sulfuric acid to about 0.7 to about 1.5 parts of water, the sulfuric acid solution and the water both being at temperatures not substantially below 50° C., whereby a precipitate of the vat dyestuff is produced, stirring the resulting mixture, and separating the precipitate from the remaining liquid by filtration.

10. The process of making a vat dyestuff paste which comprises diluting a solution of the vat dyestuff in concentrated sulfuric acid with a diluent selected from the group consisting of water, alcohol, acetic acid and a substance containing water of crystallization, the extent of dilution being insufficient to cause substantial separation of the dyestuff at 50° C., rapidly adding the diluted solution at a temperature above 50° C. to 0.5 to 1.5 parts of water which is at a temperature not substantially below 50° C., whereby a precipitate of the vat dyestuff is produced, and separating the precipitate from the remaining liquid.

11. The process of making a dyestuff paste of an anthraquinone vat dyestuff which comprises diluting a solution of the vat dyestuff in concentrated sulfuric acid with a diluent selected from the group consisting of water, alcohol, acetic acid and ferrous sulfate containing water of crystallization, the extent of dilution being insufficient to cause substantial separation of the dyestuff at 50° C., rapidly adding the diluted solution at a temperature above 50° C. to about 0.7 to 1.5 parts of water which is at a temperature not substantially below 50° C., whereby a precipitate of the vat dyestuff is produced, and separating the precipitate from the remaining liquid.

12. A process of making a dyestuff paste of an anthraquinone vat dyestuff selected from the dibenzanthrone and pyranthrone series which comprises diluting a solution of the vat dyestuff in sulfuric acid monohydrate with a diluent selected from the group consisting of water, alcohol and acetic acid, the extent of dilution being insufficient to cause substantial separation of the dyestuff at 60° C., rapidly adding the solution at a temperature between 60° and 90° C. to about an equal amount of water which is at a temperature above 60° C., whereby a precipitate of the vat dyestuff is produced, stirring the resulting mixture, diluting the resulting mixture with water, and filtering off the precipitate from the remaining solution.

13. The process of making a dyestuff paste of flavanthrone which comprises rapidly pouring a solution of flavanthrone in 10 parts of sulfuric acid monohydrate at a temperature of about 50° C., into about 7 parts of water which is at a temperature of about 60° C., whereby a precipitate of the flavanthrone is produced, adding water in an amount sufficient to reduce the sulfuric acid concentration to about 15 per cent. strength, and filtering off the resulting precipitate.

14. The process of making a dyestuff paste of a halogenated isoviolanthrone which comprises rapidly pouring a solution of a halogenated isoviolanthrone in 10 parts of concentrated sulfuric acid at a temperature of 60° to 90° C. into a substantially equal weight of water at 65° to 75° C., stirring the mixture after the addition has been completed, and filtering off the precipitate.

15. In the process of making a halogenated isoviolanthrone in the form of a paste by precipitating the halogenated isoviolanthrone, separating the precipitate, and stirring the separated precipitate in the presence of a small amount of a dispersing agent, the improvement which comprises diluting a solution of a halogenated isoviolanthrone in 10 parts of sulfuric acid monohydrate with about 1.7 parts of water, rapidly pouring the resulting solution at a temperature of 60° to 90° C. into about 10 parts of water at 65° to 75° C., stirring the mixture after the addition has been completed, further diluting the resulting suspension, and filtering off the precipitate.

16. A vat dyestuff free from a chlorindanthrone nucleus in a non-flocculent, finely-divided form obtainable by the process of claim 1.

17. In a vat dyestuff composition adapted to be mixed with a dispersing agent and/or other material for the production of a dyestuff paste or a printing paste, a vat dyestuff free from a chlorindanthrone nucleus in a non-flocculent, finely divided form obtainable by the process of claim 3.

18. As a new composition of matter, an aqueous suspension of an anthraquinone vat dyestuff free from a chlorindanthrone nucleus in a non-flocculent, finely divided form, the dyestuff particles being substantially the size of those obtainable by the process of claim 6.

19. An anthraquinone vat dyestuff free from a chlorindanthrone nucleus in a non-flocculent, finely divided form obtainable by the process of claim 8.

20. As a vat dyestuff paste, an aqueous suspension of an anthraquinone vat dyestuff selected from the benzanthrone and pyranthrone series in a non-flocculent, finely divided form obtainable by the process of claim 12.

21. As a vat dyestuff paste, an aqueous suspension of a flavanthrone vat dyestuff in a non-flocculent, finely crystalline form obtainable by the process of claim 13.

22. In the process of producing a pigment by dissolving a vat dyestuff in sulfuric acid and drowning the mass in water, the improvement which comprises using substantially boiling water as the drowning medium.

23. A process for producing an indanthrone dyestuff in finely divided solid form, which comprises treating said dyestuff with a sufficient quantity of concentrated sulfuric acid to completely dissolve the same, and then pouring the mass into a volume of water sufficient to reduce the ultimate concentration of the acid to less than 50 per cent by weight, the water being maintained during this procedure at a temperature substantially near its boiling point.

24. A process for producing a vat dyestuff in finely divided solid form, which comprises mixing a solution of the vat dyestuff in concentrated sulfuric acid with between about 0.5 and about 2 parts of warm to hot water for each part of sulfuric acid solution.

MAURICE H. FLEYSHER.
JAMES OGILVIE.